(12) United States Patent
Sullivan

(10) Patent No.: US 7,100,025 B1
(45) Date of Patent: Aug. 29, 2006

(54) APPARATUS AND METHOD FOR PERFORMING SINGLE-INSTRUCTION MULTIPLE-DATA INSTRUCTIONS

(75) Inventor: Thomas Justin Sullivan, Fort Collins, CO (US)

(73) Assignees: Hewlett-Packard Development Company, L.P., Houston, TX (US); Intel Corporation, Santa Clara, CA (US)

( * ) Notice: Subject to any disclaimer, the term of this patent is extended or adjusted under 35 U.S.C. 154(b) by 0 days.

(21) Appl. No.: 09/491,810

(22) Filed: Jan. 28, 2000

(51) Int. Cl.
*G06F 7/499* (2006.01)

(52) U.S. Cl. .......................... 712/221; 712/22; 712/26; 712/244

(58) Field of Classification Search .................. 712/22, 712/26, 221, 244, 222
See application file for complete search history.

(56) References Cited

U.S. PATENT DOCUMENTS

| | | | | |
|---|---|---|---|---|
| 3,761,922 A | * | 9/1973 | Evans | .......................... 342/93 |
| 3,979,701 A | * | 9/1976 | Tomozawa | ................... 333/166 |
| 5,596,733 A | * | 1/1997 | Worley et al. | ............... 712/244 |
| 6,038,652 A | * | 3/2000 | Phillips et al. | ............... 708/232 |
| 6,230,257 B1 | * | 5/2001 | Roussel et al. | ............. 708/524 |

\* cited by examiner

Primary Examiner—Fritz Fleming
Assistant Examiner—Tonia L. Meonske

(57) ABSTRACT

An apparatus and method for performing single-instruction multiple-data instructions using a single multiply-accumulate unit while minimizing operational latency. The multiply-accumulate unit generates a first half and a second half of a data result. A register stores the first half of the data result. A miscellaneous-logic unit determines when to release the first half of the data result from the register to synchronize the first half and the second half of the data result.

15 Claims, 4 Drawing Sheets

APPARATUS AND METHOD FOR PERFORMING SINGLE-INSTRUCTION MULTIPLE-DATA INSTRUCTIONS

TECHNICAL FIELD

The present invention is generally related to performing single-instruction multiple data (SIMD) instructions and, more particularly, is related to an apparatus and method for performing SIMD instructions (e.g., multiply-accumulate operations) using one multiply-accumulate (MAC) unit while minimizing operational latency.

BACKGROUND

SIMD instructions are those instructions that perform the same operation on two or more pieces of a data word at the same time. A SIMD data word consists of two single-precision floating-point numbers, packed into a floating-point word. In an example of a 82-bit floating-point word, the low-SIMD data is stored in bits 31–0, and the high-SIMD data is stored in bits 63–32. Remaining bits (81–64) of the 82-bit word are set to a predefined constant.

Currently, two miscellaneous units 5, 6 and two MAC units 3, 4 are used to perform SIMD instructions. Miscellaneous units (MISC) 5, 6 are devices that perform operations not requiring a multiply-accumulate operation, such as, logical functions. A first MAC unit 3 is responsible for performing a multiply-accumulate operation on the high-bits of the SIMD word. The second MAC unit 4 is responsible for performing a multiple-accumulate operation on the low-bits of the SIMD word. MAC unit results are forwarded to a single register file 7. A block diagram of an example of the prior-art system architecture to perform SIMD instructions using multiple MAC units 3, 4 is illustrated in FIG. 1. This prior-art implementation, which includes two full-precision MAC units 3, 4, further includes, two MISC units 5, 6, and two single-precision SIMD units 1, 2. The prior-art system architecture can simultaneously perform any of two SIMD instructions, one SIMD and one non-SIMD instruction, or two non-SIMD instructions.

Thus, a heretofore-unaddressed need exists in the industry to perform SIMD instructions using a single MAC unit while minimizing operational latency.

SUMMARY

The present invention provides an apparatus and method for performing SIMD instructions (e.g., multiply-accumulate operations) using one MAC unit while minimizing operational latency.

Briefly described, in architecture, an apparatus for performing single-instruction multiple-data instructions, includes a multiply-accumulate unit configured to generate a data result, the data result having a first half and a second half, a register communicatively coupled to the multiply-accumulate unit, the register configured to store the first half of the data result, and a miscellaneous-logic unit configured to initiate the release of the first half of the data result from the register to synchronize the first half of the data result with the second half of the data result.

The present invention can also be viewed as a method for performing SIMD instructions using one MAC unit while minimizing operational latency. The method can be broadly summarized as follows: providing a multiply-accumulate unit configured to generate a first half of a data result and a second half of a data result, applying the first half of the data result at an input of a register, and applying the first half of the data result and the second half of the data result at an input of a buffer when the first half of the data result and the second half of the data result are valid, otherwise applying an exception result at the input of the buffer the first half of the data result and the second half of the data result are invalid.

Other features and advantages of the present invention will become apparent to one skilled in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
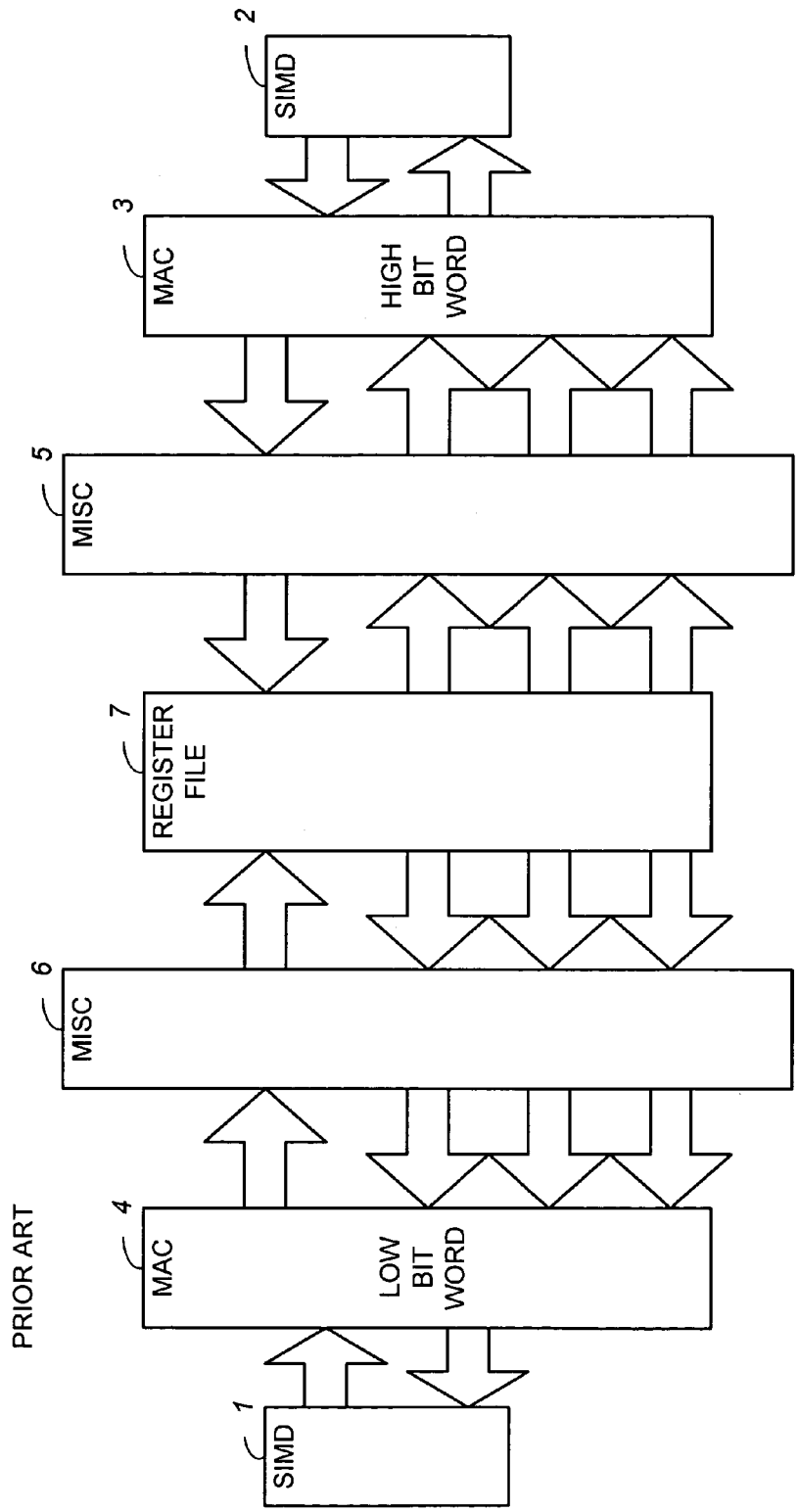
FIG. 1 is a block diagram of a prior-art system architecture capable of performing SIMD instructions using multiple MAC units.

Reference will now be made in detail to the description of the apparatus and method as illustrated in the drawings. While the apparatus and method will be described in connection with these drawings, there is no intent to limit it to the embodiment or embodiments disclosed herein. On the contrary, the intent is to cover all alternatives, modifications, and equivalents within the scope defined by the appended claims.

Figure 2:
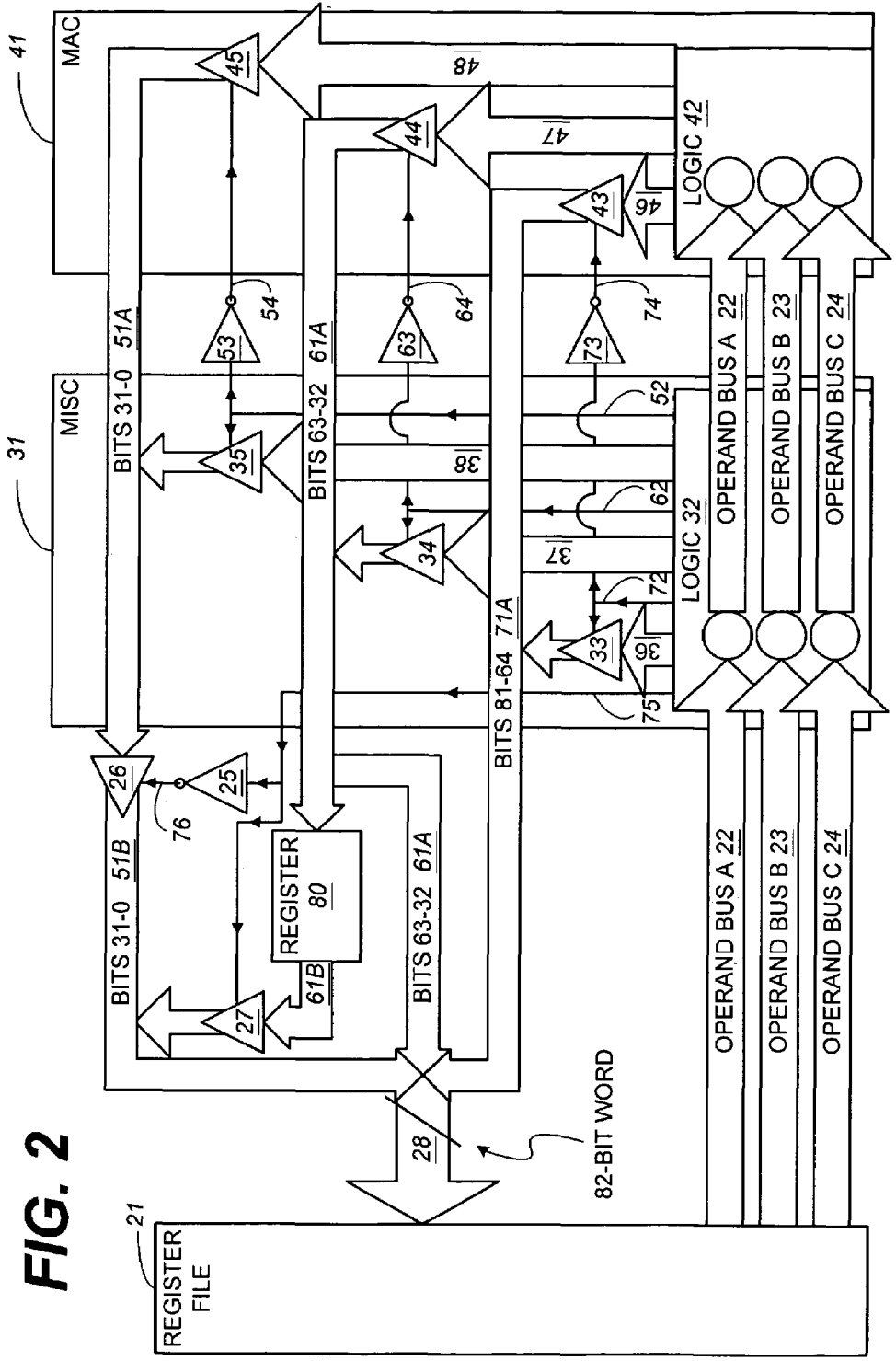
FIG. 2 is a block diagram of an embodiment of a system architecture capable of performing SIMD instructions using a single MAC unit.

Illustrated in FIG. 2 is an embodiment of a system architecture capable of performing SIMD instructions using a register and a single MAC unit. As shown, register file 21 provides operand A, operand B, and operand C data on operand busses A 22, B 23 and C 24. Operand busses A 22, B 23 and C 24 transfer operand data from the register file 21 to logic 32 in MISC 31 and to the MAC 41. There is no logic in MISC 31 between register file 21 and MAC 41 for the operands. The MAC 41 receives operand A, operand B, and operand C data on operand busses A 22, B 23, and C 24, respectively, in logic 42. Logic 42 also receives operational control codes from an external control unit (not shown for simplicity of illustration). Operational control codes are used to compute a desired result.

MISC logic 32 uses the operand A, operand B, and operand C data and operational control codes to generate a series of four sets of result control signals and their complements to control the various bus drivers in both MISC 31 and MAC 41.

Result control signal A is generated in accordance with the following expression: A=miscop+macop*misc_result+ simdop, where miscop indicates that there is an instruction for MISC 31, macop indicates that there is an instruction for MAC 41, misc_result indicates that there is a non-SIMD MAC 41 instruction that contains MISC 31 generated result(s), and simdop indicates that there is a SIMD instruction for either MISC 31 or MAC 41. Generating signal A configures data bus 36 to transmit data to result data bus 71A. Data bus 36 transmits data to result data bus 71A when signal 72 enables buffer/driver 33.

Result control signal B is generated in accordance with the following expression: B=miscop+macop*!simd* miscresult+macop*misc_result_high*simdhigh, where misc_result_high is a SIMD MAC 41 instruction with a MISC 31 result on the high-half data bits (i.e., bits 63–32), and simdhigh is the result of the SIMD operation on the high bits. Generating signal B configures data bus 37 to transmit data to the high-half result data bus 61A. Data bus 37 transmits data to the high-half result data bus 61A when signal 62 enables buffer/driver 34. The high-half result data bus 61A transmits data to register 80 for storage. Register 80 stores the first half of the data result while the second half of the data result is being computed. MISC logic 32 determines when to release the first half of the data result stored in register 80 to synchronize the first half of the data result with the second half of the data result.

Result control signal C is generated in accordance with the following expression: C=miscop+macop*!simd* miscresult+macop*misc_result_low*simdhigh, where misc_result_low is the MISC 31 result on the low data bits (i.e., bits 31–0). Generating signal C configures data bus 38 to transmit data to the result data bus 51A. Data bus 38 transmits data to the result data bus 51A when signal 52 enables buffer/driver 35.

Result control signal D is generated in accordance with the following expression: D=macop*!misc_result_low* simdhigh. Generating signal D configures data bus 61B to transmit data from register 80 to result data bus 51B. Data bus 61B transmits data to result data bus 51B when signal 75 enables buffer/driver 27.

Figure 4:
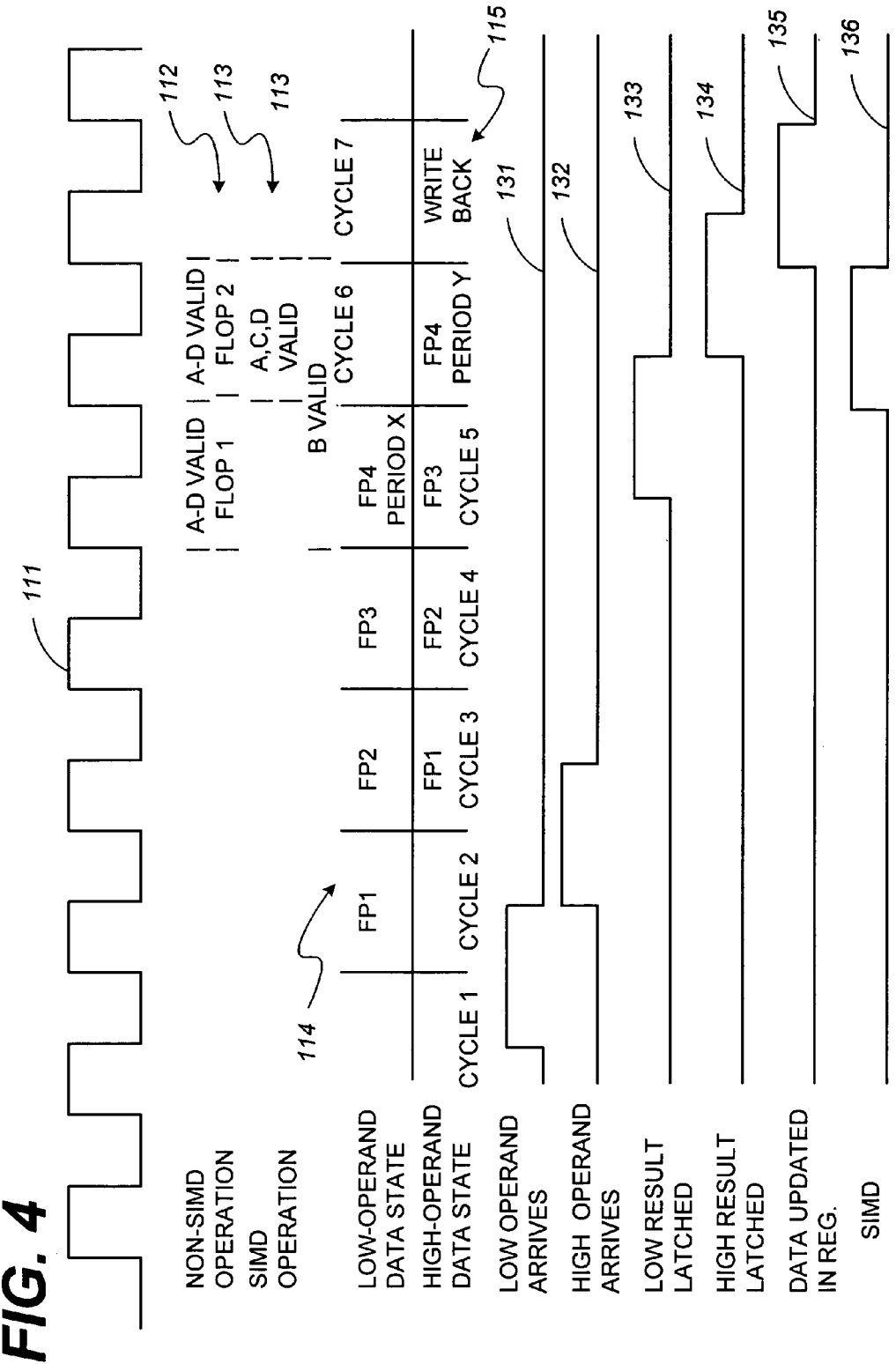
FIG. 4 is an embodiment of a timing diagram illustrating how data is processed through the system architecture of FIG. 2.

Result control signals A–D are valid in MISC 31 and MAC 41 during period x and period y on the timing diagram (FIG. 4). Signals A–D are floating point control unit signals that are qualified by the simdhigh/simdlow signals. In SIMD mode, result control A is valid during period y, result control B is valid for both periods x and y, and result control signals D&C are valid for period y. In non-SIMD mode, result control signals A–D are valid during floating-point clock stage FP4.

The result control signals listed above are generated in accordance with the following instructions and signals:
 miscop=an instruction exists for MISC 31;
 macop=an instruction exists for MAC 41;
 misc_result=a non-SIMD MAC instruction that contains results generated by MISC 31;
 misc_result_low=a SIMD MAC instruction that contains low-half data generated by MISC 31;
 misc_result_high=a SIMD MAC instruction that contains high-half data generated by MISC 31;
 simdhigh=asserted during clock stage FP4 (high-operand) during which, the results for the high-half SIMD are generated. (It is assumed that the signal simdhigh is only active when signal simd is active);
 simd=a SIMD instruction exists (for either MISC 31 or MAC 41).

These signals are generated by the MISC 31, based upon the operational control codes and operands. The operands are received by MISC 31 from register file 21. The operational control codes come from an external control unit (FPU Control) (not shown) that communicates with the main instruction fetch unit. The FPU Control and MISC 31 units are responsible for the correct staging of pipelined control information.

Bus drivers 27, 33, 34, and 35 in FIG. 2 will drive only when their enable line is asserted. An example will be illustrated with regard to FIG. 3 herein described in detail below. The present apparatus is not limited to the bus control methodology illustrated and described in association with FIG. 2. Other methods of performing the bus multiplexing are possible, such as repeating multiplexers, etc.

Note that the apparatus illustrated in FIG. 2 contains one functional unit. Those skilled in the art should understand that a second functional unit can be arranged to interface with register file 21, as shown in the system architecture of FIG. 1. However, the apparatus illustrated in FIG. 2 is able to simultaneously perform two SIMD instructions (4 total operations), one SIMD and one non-SIMD instruction, or two non-SIMD instructions. While the embodiment illustrated in FIG. 2 requires an additional cycle of latency than that of the prior-art system illustrated in FIG. 1, the apparatus of FIG. 2 enables a SIMD instruction to be executed in parallel with another instruction (SIMD or non-SIMD).

Figure 3:
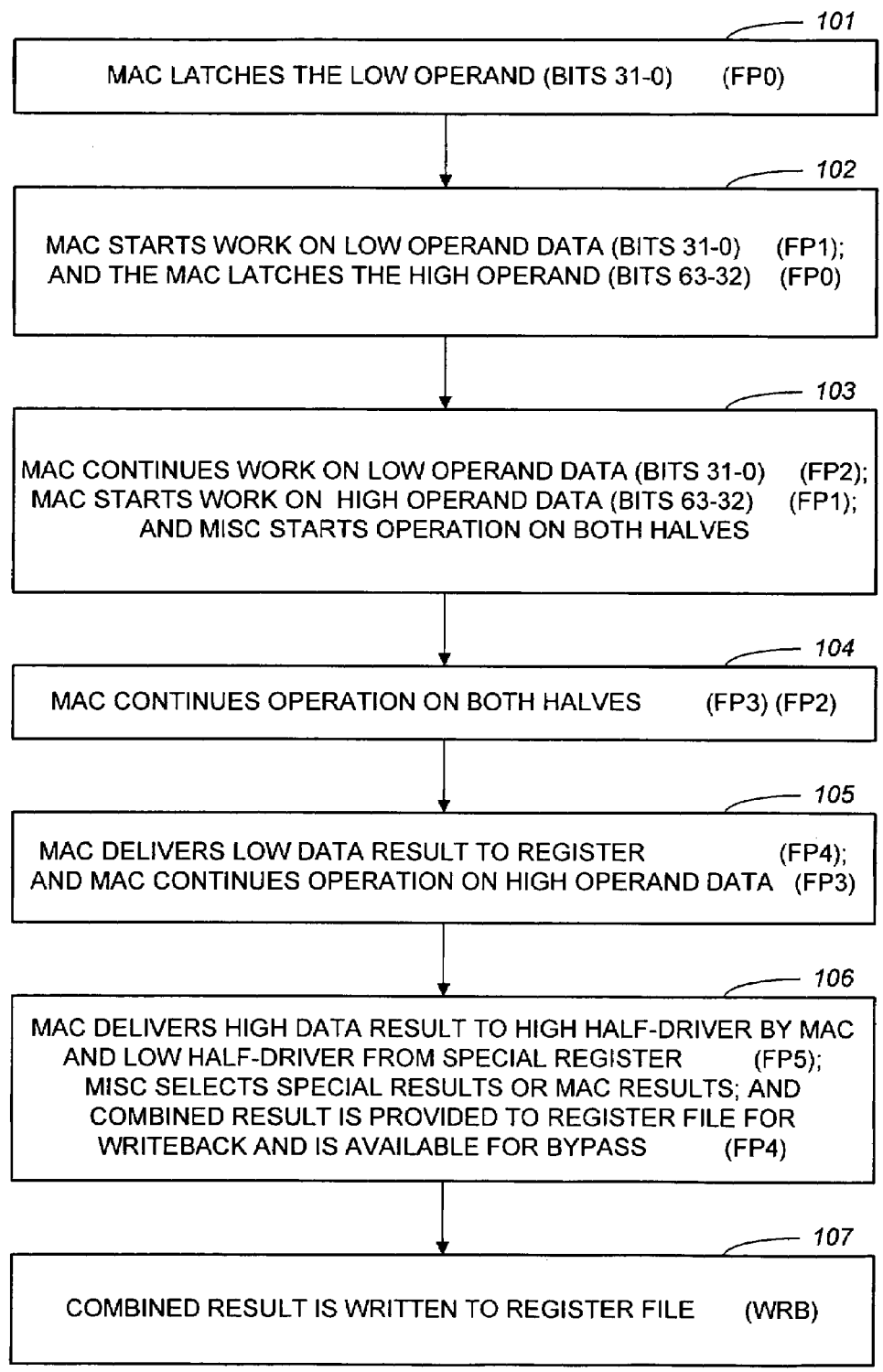
FIG. 3 is a flow chart of an embodiment of a method for processing data through the system architecture of FIG. 2.

FIG. 3 is a flow chart of an embodiment of a method for processing data through the system architecture of FIG. 2. First, the register file 21 (FIG. 2) drives data on operand busses A 22, B 23, and C 24, for two consecutive cycles. During the first cycle, as illustrated in block 101, MAC 41 latches the low-operand data into low-data latches in logic 42, which is now prepared to begin operations on the next cycle. Operational control code information arrives from the external control unit prior to or concurrently with the first clock cycle.

During the second cycle, as illustrated in block 102, MAC 41 starts operations on the low-operand data and latches the high-operand data into the high-data latches of logic 42. MISC 31 latches both high and low-operand data and operational control codes arrive via busses A 22, B 23, and C 24.

During the third cycle, as illustrated in block 103, MAC 41 continues operation on the low-operand data and starts operation on the high-operand data. The MISC 31 begins its operation on both the high and low-operand data. A second instruction (either SIMD or non-SIMD) may have its operands and/or operational control codes delivered to the MISC 31, while MAC 41 starts on the next cycle.

During the fourth cycle, as illustrated in block 104, MAC 41 continues operation on both the lower and higher-operand data. A third instruction can also enter the busses A 22, B 23, and C 24 during this cycle. This is a fully pipelined system and once the instructions leave a certain clock stage (e.g., FP1, FP2, FP3, FP4, WRB) another SIMD or non-SIMD instruction can enter that clock stage.

During the fifth cycle, as illustrated in block 105, MAC 41 delivers the low-operand data result onto the high-half result data bus 47. The low-operand data result is then transmitted to the high-half result data bus 61A. This is accomplished by applying signal 62 from logic 32 as an input at inverter 63 to generate enable signal 64. Enable signal 64 commands buffer/driver 44 to transmit lower-operand data from the high-half result data bus 47 to the high-half result data bus 61A. Signal 62 is also input in its original value into buffer/driver 34. This original value for signal 62 disables buffer/driver 34 from transmitting operand-data result from logic 32 onto high-half result data bus 61A. The low-operand data result from the high-half result data bus 61A is latched into register 80. Concurrently, during the fifth cycle, MAC 41 continues to operate on the high-operand data.

During the sixth cycle, as illustrated in block 106, MISC 31 indicates whether to use the MAC 41 results or the MISC 31 exceptional results. MISC 31 indicates which results are to be utilized by generating signals on signal lines 52, 62, 72 and 75, respectively. These signals cause the appropriate bus drivers 25–27, 33–35, 43–45, 53, 63 and 73 to place result data on result bus 51A, 61A, or 71A as desired. MISC 31 generates the following signals, illustrated in the table below, on signal lines 52, 62, 72, and 75, respectively, to command the appropriate bus drivers to place result data on result bus 51A, 61A, or 71A.

Cases 1–4 in Table I below are SIMD MAC operation cases. The cases are as follows:

TABLE I

| CASE | EXCEPTIONS | BUFFER/DRIVERS ON | SIGNALS ACTIVE |
|---|---|---|---|
| Case 1 | No exceptions | 27, 33, 44 | 64, 72, 75 |
| Case 2 | Low exception | 26, 33, 35, 44 | 52, 64, 72, not 75 |
| Case 3 | High exception | 27, 33, 34 | 62, 72, 75 |
| Case 4 | Both exceptions | 26, 33, 34, 35 | 52, 62, 72, not 75 |
| Case 5 | Non-SIMD, no exception | 26, 43, 44, 45 | 54, 64, 74, not 75 |
| Case 6 | Non-SIMD, exception | 26, 33, 34, 35 | 52, 72, not 75 |
| Case 7 | MISCOP | 26, 33, 34 | 62, 72, not 75 |

If the MISC 31 does not detect an exceptional case for the high mantissa, the MAC 41 delivers the high-operand data result onto the high-half result data bus 61A. If the MISC 31 does not detect an exceptional case for the low mantissa, register 80 drives the lower-operand data result onto the lower-half result data bus 51A.

Whenever MISC 31 detects an exception, MISC 31 delivers the result. In any of the SIMD cases, MISC 31 delivers the exponent result. MISC 31 delivers the exponent result from buffer/driver 33 by generating a signal on signal line 72.

During the seventh cycle, as illustrated in block 107, the combined result is written to the register file 21 (FIG. 2). While the system architecture illustrated and described utilizes a four clock period latency other clock cycle latencies are possible.

FIG. 4 is an embodiment of a timing diagram illustrating how data is processed through the system architecture of FIG. 2. As illustrated in FIG. 4 a plurality of non-SIMD operations 112 and SIMD operations 113 are controllably configured via result control signals A–D in accordance with low-operand data states 114 and high-operand data states 115 that correspond to clock signal trace 111. Register file 21 (FIG. 2) drives low-operand data and high-operand data on the operand busses A 22, B 23, and C24 (FIG. 2), over three consecutive clock cycles as shown by signal traces 131 and 132. The arrival of low-operand data, during clock stage FP1 for low-operand data is shown by signal trace 131. The arrival of high-operand data, during clock stage FP1 for high-operand data is indicated by signal trace 132.

As indicated by signal trace 133, a low-operand result is calculated during clock stages FP2 and FP3 and latched during clock stage FP4 for low-operand data. Signal trace 134 illustrates that a high-operand result is calculated during clock stages FP2 and FP3 and latched during clock stage FP4 for high-operand data. The apparatus of FIG. 2 is a fully pipelined system and once the instructions leave a clock state (e.g., FP1, FP2, FP3, FP4, WRB) another instruction, SIMD or non-SIMD can enter that clock stage. MISC 31 generates signals 52, 62 and 72, which control the output buffer/drivers 43, 44 and 45 (FIG. 2). Output buffer/drivers 43, 44, and 45, control the data transmitted along result data busses 51A, 61A, and 71A (FIG. 2), respectively during clock cycle 5.

During clock cycle 5, MAC 41 delivers the low-operand data result 133 onto the high-half result data bus 47 (FIG. 2). Signals on data busses 46, 47, and 48 (FIG. 2), generated by MAC 41 are dependent upon the operand and the operational control codes applied on operand busses A 22, B 23, and C 24. For SIMD instructions, high-half result data bus 47 is the most significant output bus. For non-SIMD instructions, all three busses (i.e., 46, 47 and 48 (FIG. 2)) are significant output busses. Low-operand data result is transmitted to the high-half result data bus 61A. Thereafter, low-operand data result from the high-half result data bus 61A is latched into register 80 (FIG. 2). Also, during clock cycle 5, MAC 41 (FIG. 2) continues to operate on the high-operand data as indicated by signal trace 134.

During clock cycle 6, MAC 41 (FIG. 2) delivers the high-operand data result as indicated in signal trace 134 onto the high-half result data bus 47. MISC 31 indicates whether MAC 41 results or the MISC 31 exception results are applied to high-half result data bus 47. In addition, SIMD results are now available as illustrated by signal trace 136.

During clock cycle 7, the combined result is written to the register file 21 (FIG. 2) as indicated by signal trace 135.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the principles of the invention. All such modifications and variations are intended to be included herein within the scope of the present invention and protected by the following claims.

The invention claimed is:

1. An apparatus comprising:
    a multiply accumulate (MAC) unit coupled to operand busses at respective operand inputs, the MAC unit configured to latch a first multiple-bit data value during a first cycle and execute the MAC functions on the first multiple-bit data value during the next subsequent cycle while latching a second multiple-bit data value, the MAC unit further configured to supply a first MAC result responsive to the first multiple-bit data value on a result bus once the first MAC result is available and latch a second MAC result responsive to the second multiple-bit data value;
    a register coupled to the result bus and configured to latch the first MAC result; and
    a miscellaneous logic unit coupled between the result bus and the register, the miscellaneous logic unit configured to detect one or more exceptional conditions, the miscellaneous logic unit further configured to generate first and second control signals responsive to at least one certain exceptional condition, wherein when the first control signal is asserted the MAC unit supplies the second MAC result on the result bus, when the second control signal is asserted the first MAC result is driven from the register onto the result bus, and wherein when the second control signal is not asserted a miscellaneous-unit generated result is driven onto the result bus.

2. The apparatus of claim 1, wherein the miscellaneous logic unit is configured to identify an exceptional condition responsive to an operand.

3. The apparatus of claim 1, wherein the miscellaneous logic unit is configured to recognize an exceptional condition identified by the MAC unit.

4. The apparatus of claim 3, wherein the miscellaneous logic unit directs the replacement of one of the first and second MAC results with a representation of the exceptional condition.

5. A method for performing single-instruction multiple-data instructions comprising:
 applying a plurality of data values on an operand bus for two consecutive cycles;
 latching a first data value in a multiply accumulate (MAC) unit during a first cycle;
 initiating execution of the multiply and accumulate functions on the first data value and latching a second data value in the MAC unit during a second cycle;
 deferring a first MAC unit result responsive to the first data value;
 initiating execution of the multiply and accumulate functions on the second data value during a cycle subsequent to the second cycle to generate a second MAC unit result; and
 using a miscellaneous logic unit configured to detect one or more exceptional conditions to generate a plurality of control signals responsive to the first data value, the second data value, and an exceptional condition wherein the control signals direct whether the first MAC unit result and the second MAC unit result should be used or replaced by a representation of a specific exceptional condition, respectively.

6. The method of claim 5, further comprising applying the plurality of control signals to arrange a combination selected from the first MAC unit result, the second MAC unit result, and the representation of an exceptional condition.

7. The method of claim 5, wherein deferring comprises forwarding the first MAC unit result to a register.

8. The method of claim 5, wherein using a miscellaneous logic unit comprises determining when an operand is invalid.

9. The method of claim 5, wherein using a miscellaneous logic unit comprises determining when an operation in combination with an operand will produce an exceptional condition.

10. The method of claim 5, further comprising forwarding the combination to a result bus.

11. An apparatus comprising:
 means for producing control signals responsive to a first data value, a second data value, and one or more exceptional conditions, wherein the exceptional conditions result from the execution of a multiply accumulate (MAC) unit over the first and second data values in sequential order, the means for producing configured to detect the one or more exceptional conditions; and
 means for arranging a combination selected from a first MAC unit result, a second MAC unit result, and a representation of a specific exceptional condition responsive to the plurality of control signals, wherein the control signals direct whether the first MAC unit result and the second MAC unit result should be used or replaced by the representation of the specific exceptional condition, respectively.

12. The apparatus of claim 11, wherein the first MAC unit result is responsive to the first data value.

13. The apparatus of claim 11, wherein the second MAC unit result is responsive to the second data value.

14. The apparatus of claim 11, wherein the exceptional condition is identified by the MAC unit.

15. The apparatus of claim 11, wherein the exceptional condition is identified by the means for producing the plurality of control signals responsive to at least one of the first and second data values and an opcode.

* * * * *

UNITED STATES PATENT AND TRADEMARK OFFICE
CERTIFICATE OF CORRECTION

PATENT NO.        : 7,100,025 B1
APPLICATION NO. : 09/491810
DATED             : August 29, 2006
INVENTOR(S)       : Thomas Justin Sullivan It is certified that error appears in the above-identified patent and that said Letters Patent is hereby corrected as shown below:

In column 1, line 27, delete "operation" and insert -- functions --, therefor.

In column 4, line 47, delete "lower" and insert -- low --, therefor.

In column 4, lines 47-48, delete "higher-operand" and insert -- high-operand --, therefor.

In column 5, line 3, delete "exceptional" and insert -- exception --, therefor.

In column 5, line 21, delete "34" and insert -- 44 --, therefor.

In column 7, line 26, in Claim 5, after "condition" insert -- , --.

Signed and Sealed this

Thirty-first Day of March, 2009

JOHN DOLL
*Acting Director of the United States Patent and Trademark Office*